United States Patent [19]
Kuch et al.

[11] 3,718,645
[45] Feb. 27, 1973

[54] 1,5-BENZODIAZEPINES AND PROCESS FOR PREPARING THEM

[75] Inventors: Heinz Kuch, Frankfurt am Main; Irmgard Hoffman, Bad Soden, Taunus, both of Germany

[73] Assignee: Farbwerke Hoechst Aktiengesellschaft vormals Meister, Lucius & Bruning, Frankfurt am Main, Germany

[22] Filed: May 6, 1971

[21] Appl. No.: 140,978

[30] Foreign Application Priority Data

April 15, 1970 Germany.....................P 21 18 262.7

[52] U.S. Cl. .........................260/239.3 B, 424/244
[51] Int. Cl. ..............................C07d 53/04
[58] Field of Search ............................260/239.3 B

[56] References Cited

OTHER PUBLICATIONS

Rossi et al., "A Chimicce E L'Industria" (May 1969) Vol. 51, No. 5 pages 479–483

Primary Examiner—John D. Randolph
Assistant Examiner—Robert T. Bond
Attorney—Curtis, Morris & Safford

[57] ABSTRACT

Dialkylphosphinylalkylene-substituted 1,5-benzodiazepines useful as medicaments in the treatment of psychic diseases are obtainable by reacting the corresponding benzodiazepines with a dialkylphosphinylalkyl halide or by reacting a 2-dialkyl-phosphinylalkylaminodiphenylamine with a malonic acid dihalide or alkylmalonic acid dihalide.

3 Claims, No Drawings

1,5-BENZODIAZEPINES AND PROCESS FOR PREPARING THEM

The present invention relates to 1,5-benzodiazepines and to a process for preparing them.

More particularly, the invention relates to new benzodiazepine derivatives of the general formula I

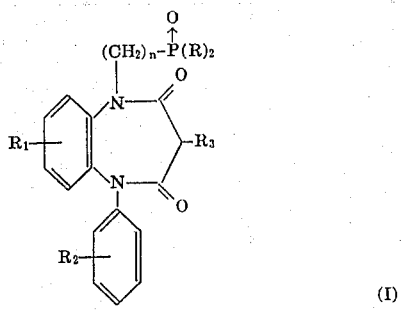

in which R represents an alkyl group having one to three carbon atoms, $R_1$ and $R_2$ which may be identical or different, represent a hydrogen atom or a halogen atom, the trifluoromethyl or nitro group, or an alkoxy group having one to two carbon atoms, $R_3$ represents a hydrogen atom or an alkyl group having one to three carbon atoms, and $n$ represents a number from 1 to 3.

The invention furthermore provides a process for preparing the above-specified compounds of the formula I, which comprises a. reacting in the presence of metallizing agents 1,5-benzodiazepine derivatives of the general formula II

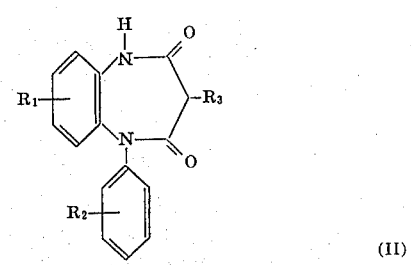

in which $R_1$, $R_2$ and $R_3$ have the meanings given above, with dialkyl-phosphinylalkyl compounds of the general formula III

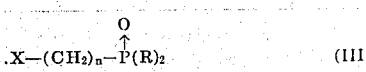

in which R and n have the meanings given above and X represents a halogen atom or an alkane-sulfonic acid or aryl-sulfonic acid radical, or b. reacting a 2-amino-diphenylamino derivative of the general formula IV

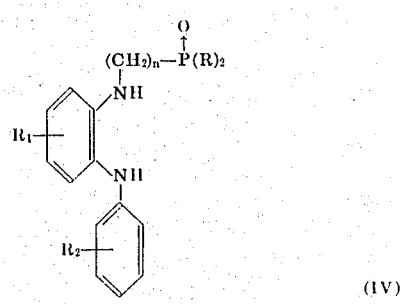

in which R, $R_1$, $R_2$ and n have the meanings given above, with a malonic acid dihalide or alkyl-malonic acid dihalide, optionally while using acid-binding agents.

As benzodiazepines of the general formula II which may be used as starting substances in method a) of the process of the invention and which may be prepared according to known processes (cf. "DOS No. 1 668 634" and "DOS No. 1 670 190" (published German Applications)), there may be mentioned:

5-phenyl-1,2,4,5-tetrahydro-3H-1,5-benzodiazepine-2,4-dione, 5-(4'-methoxyphenyl)-1,2,4,5-tetrahydro-3H-1,5-benzodiazepine-2,4-dione, 6-chloro-5-phenyl-1,2,4,5-tetrahydro-3H-1,5-benzodiazepine-2,4-dione, 7-fluoro-5-phenyl-1,2,4,5-tetrahydro-3H-1,5-benzodiazepine-2,4-dione, 7-chloro-5-phenyl-1,2,4,5-tetrahydro-3H-1,5-benzodiazepine-2,4-dione, 7-chloro-5-(2'-fluorophenyl)-1,2,4,5-tetrahydro-3H-1,5-benzodiazepine-2,4-dione, 7-chloro-5-(2'-chlorophenyl)-1,2,4,5-tetrahydro-3H-1,5-benzodiazepine-2,4-dione, 7-Bromo-5-phenyl-1,2,4,5-tetrahydro-3H-1,5-benzodiazepine-2,4-dione, 5-phenyl-7-trifluoromethyl-1,2,4,5-tetrahydro-3H-1,5-benzodiazepine-2,4-dione, 7-nitro-5-phenyl-1,2,4,5-tetrahydro-3H-1,5-benzodiazepine-2,4-dione, 7-methoxy-5-phenyl-1,2,4,5-tetrahydro-3H-1,5-benzodiazepine-2,4-dione, 7-methoxy-5-phenyl-1,2,4,5-tetrahydro-3H-1,5-benzodiazepine-2,4-dione, 8-methoxy-5-phenyl-1,2,4,5-tetrahydro-3H-1,5-benzodiazepine-2,4-dione, 7-chloro-3-methyl-5-phenyl-1,2,4,5-tetrahydro-3H-1,5-benzodiazepine-2,4-dione and 7-chloro-5-(2'-chlorophenyl)-3-methyl-1,2,4,5-tetrahydro-3H-1,5-benzodiazepine-2,4-dione.

The corresponding dialkyl-phosphinylalkyl compounds of the general formule III, for example chloromethyl-dimethyl-phosphine-oxide, bromomethyl-dimethyl-phosphine-oxide, 2-chloroethyl-dimethyl-phosphine-oxide, 3-chloroporoyl-dimethyl-phosphine oxide, iodomethyl-dimethyl-phosphine-oxide, methane-sulfonic acid-dimethyl-phosphinylmethyl ester, p-toluenesulfonic acid-dimethylphosphinylmethyl ester are likewise obtained according to known processes, also the corresponding derivatives of the above-mentioned compounds in which the term "dimethyl" is replaced by "-diethyl," "dipropyl" or "di-isopropyl."

The reaction according to method (a) of the process of the invention is generally carried out by converting at first a benzodiazepine of the general formula II with the aid of a metallizing agent into the corresponding metal compound and reacting the latter, preferably in the same reaction vessel, with a dialkyl-phosphinyl-alkyl compound of the general formula III. Under circumstances, it may also be of advantage to reverse this order and to add slowly, in small portions, the alkali metal compound to a mixture of the benzodiazepine with the dialkyl-phosphinyl-alkyl compound. Finally, the benzodiazepines prepared according to "DOS No. 1 670 190" (published German application) by alkaline cyclization of corresponding N-(2-aminophenyl)-N-phenyl-malonic acid alkyl ester amides of the general formula II can also be reacted, without previous isolation, with a dialkyl-phosphinyl-alkyl derivative of the general formula III.

The metallizing agents used for the reaction are the usual, preferably alkali metal or alkaline earth metal hydrides, for example sodium hydride, calcium hydride, alkali metal amides such as lithium amide or sodium amide and alkali metal alcoholates such as sodium methylate and sodium ethylate or potassium tert. butylate.

As solvents, there may be used in particular inert solvents, for example aromatic hydrocarbons such as benzene, toluene, xylene, ethers such as tetrahydrofurane or dioxane, tertiary amides such as dimethylformamide, dimethylacetamide, furthermore acetonitrile, as well as, in the case alkali metal alcoholates are used, also the corresponding alcohols.

According to the reactivity of the phosphorus component, the reaction according to the invention is carried out at temperatures in the range of from 0° C to 200° C, preferably between 20° and 160° C. Depending on the temperature used and on the reactivity of the components, the reaction times can be varied within wide limits.

The reaction according to method (b) of the process of the invention is carried out preferably in a suitable inert solvent, for example toluene, xylene, tetrahydrofurane, dioxane or dimethylformamide at temperatures in the range from 20° C. to the boiling temperatures of the respective solvent used. The addition of an acid-binding agent, for example a tertiary organic base such as pyridine or triethylamine is in general particularly advantageous.

As the final products which may be obtained according to the process of the invention, the following compounds may be mentioned:

1-(dimethylphosphinylmethyl)-5-phenyl-1,2,4,5-tetrahydro-3H-1,5-benzodiazepine-2,4-dione, 1-(dimethylphosphinylmethyl)-5-(4'-methoxyphenyl)-1,2,4,5-tetrahydro-3H-1,5-benzodiazepine-2,4-dione, 6-chloro-1-(dimethylphosphinylmethyl)-5-phenyl-1,2,4,5-tetrahydro-3H-1,5-benzodiaziepine-2,4-dione, 1-(dimethylphosphinylmethyl)-7-fluoro-5-phenyl-1,2,4,5-tetrahydro-3H-1,5-benzodiazepine-2,4-dione, 7-chloro-1-(dimethylphosphinylmethyl)-5-phenyl-1,2,4,5-tetrahydro-3H-1,5-benzodiazepine-2,4-dione, 7-chloro-1-(dimethylphosphinylpropyl)-5-phenyl-1,2,4,5-tetrahydro-3H-1,5-benzodiazepine-2,4-dione, 7-chloro-1-(diethylphosphinylmethyl)-5-phenyl-1,2,4,5-tetrahydro-3H-1,5-benzodiazepine-2,4-dione, 7-chloro-1-(di-n-propylphosphinylmethyl)-5-(2'-fluorophenyl)-1,2,4,5-tetrahydro-3H-1,5-benzodiazepine-2,4-dione, 7-chloro-1-(dimethylphosphinylmethyl)-5-(2'-chlorophenyl)-1,2,4,5-tetrahydro-3H-1,5-benzodiazepine-2,4-dione, 7-bromo-1-(dimethylphosphinylmethyl)-5-phenyl-1,2,4,5-tetrahydro-3H-1,5-benzodiazepine-2,4-dione, 1-(dimethylphosphinylmethyl)-5-phenyl-7-trifluoromethyl-1,2,4,5-tetrahydro-3H-1,5-benzodiazepine-2,4-dione, 1-(dimethylphosphinylmethyl)-7-nitro-5-phenyl-1,2,4,5-tetrahydro-3H-1,5-benzodiazepine-2,4-dione, 1-(dimethylphosphinylmethyl)-7-methoxy-5-phenyl-1,2,4,5-tetrahydro-3H-1,5-benzodiazepine-2,4-dione, 1-(dimethylphosphinylmethyl)-8-methoxy-5-phenyl-1,2,4,5-tetrahydro-3H-1,5-benzodiazepine-2,4-dione, 7-chloro-1-(dimethylphosphinylmethyl)-3-methyl-5-phenyl-1,2,4,5-tetrahydro-3H-1,5-benzodiazepine-2,4-dione, 7-chloro-5-(2'-chloro-phenyl)-1-(dimethylphosphinylmethyl)-3-methyl-1,2,4,5-tetrahydro-3H-1,5-benzodiazepine-2,4-dione.

The new compounds of the general formula I posses valuable pharmacological properties, especially a centrally depressive, tranquillizing, relaxing, narcosis-prolonging and anti-convulsive action and a very low toxicity. Compared with benzodiazepines of similar structure, which however do not contain the dialkyl-phosphinylalkyl group, the compounds of the invention in addition have the advantage of being better soluble in water which makes them suitable especially also for parenteral application.

The compounds of the invention are suitable as medicaments in the treatment of psychic diseases, for example depressions, psychoneuroses, ill-humors, conditions of fear and tension, of neurotic and psychotic genesis.

The compounds of the invention may be administered in the form of tablets, dragees, capsules, suppositoires or in the form of solutions, suspension or emulsions. These pharmaceutical preparations, which are manufactured according to the usual galenical methods, may contain in addition to the active substance also the usual adjuvants and excipients and/or other therapeutically valuable substances, which do not react with the active substances of the invention. They may be sterilized and/or combined with stabilizers.

The following Examples illustrate the invention:

EXAMPLE 1

1—(Dimethylphosphinylmethyl)-5-phenyl-1,2,4,5-tetrahydro-3H-1,5-benzodiazepine-2,4-dione 12.6 g (0.05 mole) of 5-phenyl-1,2,4,5-tetrahydro-3 H-1,5-benzodiazepine-2,4-dione were dissolved in 350 ml of dimethylformamide and to this solution, 2.5 g of sodium hydride (about 50 percent strength in paraffin oil) were added in portions, at 10° – 20° C, while stirring, whereupon the sodium compound precipitated in the form of a thick crystal magma. Then, 6.5 g of chloromethyl-dimethyl-phosphine-oxide and 0.2 g of sodium iodide were added and the reaction mixture was heated for 3 hours to 120° – 130° C. After cooling, the content of the flask was filtered and the filtrate was concentrated under reduced pressure. The crude 1-(dimethylphosphinylmethyl)-5-phenyl-1,2,4,5-tetrahydro-3H-1,5-benzodiazepine-2,4-dione could be purified by recrystallization from a mixture of chloroform and petroleum ether (boiling point 60°–95° C) or toluene and methanol with the use of charcoal; 13.0 g (76 percent of the theory) of colorless crystals melting at 253° – 255° C were obtained.

EXAMPLE 2

7-Chloro-1-(dimethylphosphinylmethyl)-5-phenyl-1,2,4,5-tetrahydro-3H-1,5-benzodiazepine-2,4-dione a. 5 g of sodium hydride (about 50 percent strength in paraffin oil) was added portionwise, while stirring and cooling with ice, to a suspension of 28.7 g (0.1 mole) of 7-chloro-5-phenyl-1,2,4,5-tetrahydro-3H-1,5-benzodiazepine-2,4-dione in 300 ml of dimethylformamide and the whole was tirred for 30 minutes. After addition of 13.0 g of chloromethyl-dimethyl-phosphineoxide and 0.2 g of sodium iodide, the reaction mixture was heated for 2 hours to 125° C, filtered and the solvent was then removed by filtration under reduced pressure. The residue was extracted several times with chloroform; the combined chloroform solutions were clarified with charcoal, concentrated and allowed to crystallize after addition of petroleum ether. The 7-chloro-1-(dimethylphosphinylmethyl)-5-phenyl-1,2,4,5-tetrahydro-3H-1,5-benzodiazepine-2,4-dione (melting point 255° – 257° C) obtained in this manner could be purified by renewed recrystallization from a mixture of toluene and methanol or chloroform and petroleum ether.

Yield: 26.9 g (71 percent of the theory) of colorless crystals. Melting point 257° – 258° C.

b. 14.4 g (0.05 mole) of 7-chloro-5-phenyl-1,2,4,5-tetrahydro-3H-1,5-benzodiazepine-2,4-dione in 200 ml of dimethylformamide were converted as described under a) with 2.5 g of sodium hydride (50 percent strength in oil) into the sodium salt and the latter was combined with 9.5 g of methane-sulfonic acid-dimethylphosphinyl-methyl ester. After having heated the whole for 3 hours to about 100° C, the solvent was removed under reduced pressure and the residue was worked up as described under (a).

Yield: 12.4 g (66% of the theory) of 7-chloro-1-(dimethylphosphinylmethyl)-5-phenyl-1,2,4,5-tetrahydro-1,5-benzodiazepine-2,4-dione; melting point 257° – 258° C.

c. 13.3 g of N-(2-amino-5-chlorophenyl)-N-phenyl-malonic acid ethyl ester amide were introduced in portions, while stirring, at room temperature, into a sodium ethylate solution of 160 ml of absolute ethanol and 1.2 g of sodium. After having stirred the whole at 20° – 25° C for 3 hours, the reaction mixture was combined with 6.6 g of chloromethyl-dimethyl-phosphine oxide and heated for 6 hours under reflux. The content of the flask was then poured into a great amount of water and the aqueous solution was extracted several times with methylene chloride after having been clarified with charcoal. The 7-chloro-1-(dimethyl-phospinylmethyl)-5-phenyl-1,2,4,5-tetrahydro-3H-1,5benzodiazepine-2,4-dione which remained behind after evaporation of the methylene chloride was purified as described under a). Melting point 257° – 258° C.

We claim:
1. A compound of the formula I

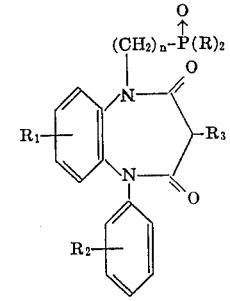

(I)

in which R represents an alkyl group having one to three carbon atoms, $R_1$ and $R_2$ which may be identical or different, represent a hydrogen atom or a halogen atom, the trifluoromethyl or nitro group, or an alkoxy group having one to two carbon atoms, $R_3$ represents a hydrogen atom or an alkyl group having one to three carbon atoms, and $n$ represents a number from 1 to 3.

2. The compound defined in claim 1 wherein R is $CH_3$, $R_1$, $R_2$ and $R_3$ are hydrogen, and $n$ is 1.

3. The compound defined in claim 1 wherein R is $CH_3$, $R_1$ is chloro substituted in the 7-position, $R_2$ and $R_3$ are hydrogen and $n$ is 1.

* * * * *

UNITED STATES PATENT OFFICE
CERTIFICATE OF CORRECTION

Patent No. 3,718,645          Dated February 27, 1973

Inventor(s) Heinz Kuch et al.

It is certified that error appears in the above-identified patent and that said Letters Patent are hereby corrected as shown below:

In heading, Item [30], change the date of German Application P 21 18 262.7 from "April 15, 1970" to --April 15, 1971--.

Signed and sealed this 11th day of June 1974.

(SEAL)
Attest:

EDWARD M. FLETCHER, JR.           C. MARSHALL DANN
Attesting Officer          Commissioner of Patents